United States Patent
Mukasa

(10) Patent No.: US 9,818,255 B2
(45) Date of Patent: Nov. 14, 2017

(54) VIDEO GAME INCENTIVIZING OUTSIDE ASSISTANCE

(71) Applicant: KONAMI DIGITAL ENTERTAINMENT CO., LTD., Tokyo (JP)

(72) Inventor: Shigehito Mukasa, Minato-ku (JP)

(73) Assignee: KONAMI DIGITAL ENTERTAINMENT CO., LTD., Minato-Ku, Tokyo (JP)

( * ) Notice: Subject to any disclaimer, the term of this patent is extended or adjusted under 35 U.S.C. 154(b) by 479 days.

(21) Appl. No.: 14/388,215

(22) PCT Filed: Mar. 26, 2013

(86) PCT No.: PCT/JP2013/058725
§ 371 (c)(1),
(2) Date: Sep. 25, 2014

(87) PCT Pub. No.: WO2013/146756
PCT Pub. Date: Oct. 3, 2013

(65) Prior Publication Data
US 2015/0087422 A1    Mar. 26, 2015

(30) Foreign Application Priority Data
Mar. 30, 2012    (JP) .................................. 2012-081078

(51) Int. Cl.
*G06F 17/00* (2006.01)
*G07F 17/32* (2006.01)
(Continued)

(52) U.S. Cl.
CPC ........ *G07F 17/3225* (2013.01); *A63F 13/795* (2014.09); *A63F 13/822* (2014.09);
(Continued)

(58) Field of Classification Search
None
See application file for complete search history.

(56) References Cited

U.S. PATENT DOCUMENTS

| | | | |
|---|---|---|---|
| 6,764,402 B2 * | 7/2004 | Tajiri | A63F 13/34 |
| | | | 273/138.1 |
| 7,357,719 B2 * | 4/2008 | Yamato | A63F 13/10 |
| | | | 463/29 |

(Continued)

FOREIGN PATENT DOCUMENTS

| | | |
|---|---|---|
| JP | 2006-175004 A | 7/2006 |
| JP | 2010-167140 A | 8/2010 |
| JP | 2012-040042 A | 3/2012 |

OTHER PUBLICATIONS

International Search Report (PCT/JP2013/058725); dated Jul. 9, 2013.

*Primary Examiner* — Lawrence Galka
(74) *Attorney, Agent, or Firm* — Howard & Howard Attorneys PLLC

(57) ABSTRACT

Provided is a game system that makes it possible for different user groups mutually to participate in the progression of a game. In a game system (1), a user terminal (8) that provides a mobile game to a first user group, a game machine (GM) that provides an arcade game to a second user group that is different from the first user group, and a center server (3) that provides a predetermined service thereto, are connected together via a network. And, upon the condition that the first user of the first user group expends a predetermined value, the game system (1) provides an advantageous situation for the arcade game to the second user of the second user group; and moreover, if a benefit condition is satisfied in the arcade game, confers a benefit that can be used in the mobile game upon the first user.

9 Claims, 9 Drawing Sheets

(51) Int. Cl.
*A63F 13/822* (2014.01)
*A63F 13/795* (2014.01)

(52) U.S. Cl.
CPC .......... *G07F 17/32* (2013.01); *G07F 17/3272* (2013.01); *G07F 17/3274* (2013.01)

(56) References Cited

U.S. PATENT DOCUMENTS

| | | | | |
|---|---|---|---|---|
| 7,717,782 | B2* | 5/2010 | Van Luchene | A63F 13/847 463/9 |
| 8,282,458 | B2* | 10/2012 | Reynolds | A63F 13/822 463/40 |
| 8,328,643 | B1* | 12/2012 | Osvald | G06Q 10/101 434/107 |
| 8,480,494 | B2* | 7/2013 | Cantor | A63F 13/12 463/40 |
| 2007/0087797 | A1* | 4/2007 | Van Luchene | A63F 13/12 463/1 |
| 2007/0191103 | A1* | 8/2007 | Van Luchene | G07F 17/32 463/42 |
| 2007/0191104 | A1* | 8/2007 | Van Luchene | G07F 17/32 463/42 |
| 2008/0139318 | A1* | 6/2008 | Van Luchene | A63F 13/12 463/42 |
| 2010/0227669 | A1* | 9/2010 | Van Luchene | A63F 13/12 463/23 |
| 2012/0004038 | A1* | 1/2012 | Van Luchene | G07F 17/32 463/42 |
| 2013/0035158 | A1* | 2/2013 | Osvald | A63F 13/655 463/30 |
| 2013/0130762 | A1* | 5/2013 | John | A63F 13/795 463/9 |
| 2013/0143672 | A1 | 6/2013 | Azuma et al. | |
| 2013/0178281 | A1* | 7/2013 | Ayyar | A63F 13/12 463/30 |
| 2013/0231182 | A1* | 9/2013 | Hall | A63F 13/12 463/31 |

* cited by examiner

VIDEO GAME INCENTIVIZING OUTSIDE ASSISTANCE

CROSS REFERENCE TO RELATED APPLICATION

This application is a national stage application of PCT/JP2013/058725, filed Mar. 26, 2013, which claims priority to Japanese Patent Application No. 2012-081078, filed Mar. 30, 2012, the disclosures of which are hereby incorporated by reference in their entirety.

TECHNICAL FIELD

The present invention relates to a game system in which one or more game machines and a server device that supplies a predetermined service to these one or more game machines are connected via a network, to a control method used therefor, and a non-transitory computer readable storage medium storing a computer program.

BACKGROUND ART

A game system is per se known in which one or more commercial game machines and a server device that provides a predetermined service to these one or more game machines are connected together via a network. Moreover, among game systems of this type, a game system is further per se known that is also connected to a personal computer or to a portable information terminal of a user, and that provides a predetermined service thereto via the server device (for example, refer to Patent Document #1).

CITATION LIST

Patent Literature

Patent Document #1: Japanese Laid-Open Patent Publication 2006 175004.

SUMMARY OF INVENTION

Technical Problem

With the game system in Patent Document #1, a service corresponding to a game provided by a commercial game machine is provided via a server device to a portable information terminal or the like. In some games provided by a game machine of this type, for example, a character in the game develops and grows according to the playing time or the like. With this type of game, there is a tendency for the growth of the character to depend upon the playing time or upon the number of games (i.e. upon the cost of playing). In this case, if a player is not able to secure his playing time or the like, then there is a possibility that his motivation for playing the game may decrease, even though his capability for playing the game is high. On the other hand, there are some game systems which provide a game to a portable information terminal device or the like from a server device via a network. The users of portable information terminal devices or the like of this type and the users of business game machines are often different. Accordingly, it is often the case that cooperation between the game on the game machine and the game on the portable information terminals or the like is not adequate. Due to this, there is scope for enhancement of the motivation for playing the game by improving cooperation between the users of the game machines and the users of the portable information terminals or the like.

Thus, the object of the present invention is to provide a game system with which it is possible for different user groups mutually to participate in the progression of a game, and a control method and a non-transitory computer readable storage medium storing a computer program that are used by such a game system.

Solution to Technical Problem

The game system according to the present invention is a game system in which a first game terminal that provides a first game to a first user group, a second game terminal that provides a second game to a second user group that is different from the first user group, and a server device that provides predetermined services to the first game terminal and to the second game terminal are connected together via a network, comprises: a value data storage device adapted and configured to store value data in which a correspondence between first user information for specifying first users of the first user group, and predetermined values that are possessed by the first users and that can be used in the first game, is described; a situation provision device adapted and configured to, upon the condition that at least one first user of the first user group expends at least a portion of the predetermined value that he himself possesses, provide an advantageous situation for progression in the second game to a specified second user of the second user group; and a benefit conferring device adapted and configured to, if the specified second user satisfies a predetermined benefit condition in the second game, confer a predetermined benefit that can be used in the progression of the first game, on the one first user.

According to the present invention, the advantageous situation for the progression of the second game which is played by the specified user of the second group is conferred on the basis of expenditure of the predetermined value possessed by at least the one user of the first user group. Due to this, the first user group is able to participate in the progression of the game of the second user group. On the other hand, if the specified user satisfies the predetermined benefit condition in the second game, then the predetermined benefit that can be utilized in the progression of the first game is conferred upon the user who had expended the predetermined value in order to confer the advantageous situation. Due to this, the second user group is able to participate in the progression of the game of the first user group. In other words, it is possible for the first user group and the second user group, which are different, to mutually participate in the progression of one another's games. Due to this, even if there is a user whose playing time or number of games (i.e. playing cost) cannot be sufficiently ensured, still it is possible for him to benefit in the progression of the game by utilizing his own playing capability or property (i.e. a predetermined value that he possesses). Due to this, it is possible to enhance his motivation for playing the game. Moreover, if the predetermined benefit condition relates to progression in the game, then, since a situation that is advantageous for progression in the game is conferred due to the first user expending the predetermined value, accordingly the possibility that the second user will satisfy the predetermined benefit condition becomes higher. In other words, it is possible to make the expenditure of the predetermined value and the possibility of the predetermined benefit being conferred operate together. Due to this, it is possible to stimulate the gambling spirit of the users, and to promote mutual participation.

In an aspect of the game system of the present invention, as the second game, a game in which the predetermined value can be used in common with the first game, may be performed; and as the advantageous situation, the situation provision device may provide a predetermined value that corresponds to the predetermined value expended by the one first user, to the specified second user. In this case, it is possible to strike a balance between the predetermined value that is expended and the advantageous situation that is conferred.

In an aspect of the game system of the present invention, the predetermined benefit may be set so that its value is higher, the higher is the predetermined value that is expended. In this case, it is possible to stimulate the gambling spirit of the first users more effectively.

In an aspect of the game system of the present invention, a mission which is to be accomplished successfully in the second game may be employed as the predetermined benefit condition; and the benefit conferring device may determine that the predetermined benefit condition has been satisfied if the mission has been successfully accomplished. In this case, for the conferring of the predetermined benefit, it is possible to utilize the capability of a specified user to succeed in the mission, in other words his capability to play the game. Moreover, according to this aspect of the invention, the predetermined benefit may be set so that its value is higher, the higher is the difficulty of the mission. In this case, it is possible to stimulate the gambling spirit of the first users more effectively.

In an aspect of the game system of the present invention, if, as at least the one first user, a plurality of first users expend the predetermined value for the specified second user, then the predetermined benefit varies so that the value of the benefit per one user becomes higher, the lower is the number of first users who expend the predetermined value. In this case, it is possible to prevent the subject that expends the predetermined value from becoming unbalanced. On the other hand, since the value of the benefit that is obtained becomes higher, the smaller is the number of users who expend the predetermined value, accordingly it is possible to stimulate the gambling spirit of the first users more effectively.

Game terminals of any type could be employed as the first game terminal and as the second game terminal. For example, in an aspect of the game system of the present invention, different platforms may be used for the first game terminal and for the second game terminal.

The control method according to the present invention is a control method of controlling a computer incorporated in a game system in which a first game terminal that provides a first game to a first user group, a second game terminal that provides a second game to a second user group that is different from the first user group, and a server device that provides predetermined services to the first game terminal and to the second game terminal are connected together via a network, and which comprises a value data storage device adapted and configured to store value data in which a correspondence between first user information for specifying first users of the first user group, and predetermined values that are possessed by the first users and that can be used in the first game, is described, and wherein the control method of controlling the computer comprises the steps: a situation provision step, upon the condition that at least one first user of the first user group expends at least a portion of the predetermined value that he himself possesses, that provides an advantageous situation for progression in the second game to a specified second user of the second user group; and a benefit conferring step, if the specified second user satisfies a predetermined benefit condition in the second game, that confers a predetermined benefit that can be used in the progression of the first game, on the one first user.

And the computer program according to the present invention is a non-transitory computer readable storage medium storing a computer program for a game machine in which a first game terminal that provides a first game to a first user group, a second game terminal that provides a second game to a second user group that is different from the first user group, and a server device that provides predetermined services to the first game terminal and to the second game terminal are connected together via a network, and which comprises a value data storage device adapted and configured to store value data in which a correspondence between first user information for specifying first users of the first user group, and predetermined values that are possessed by the first users and that can be used in the first game, is described, and wherein the computer program is configured so as to cause a computer which is incorporated in the game machine to serve as: a situation provision device adapted and configured to, upon the condition that at least one first user of the first user group expends at least a portion of the predetermined value that he himself possesses, provide an advantageous situation for progression in the second game to a specified second user of the second user group; and a benefit conferring device adapted and configured to, if the specified second user satisfies a predetermined benefit condition in the second game, confer a predetermined benefit that can be used in the progression of the first game, on the one first user. By performing the control method of the present invention, or by executing the computer program according to the present invention, it is possible to implement the game system of the present invention.

Advantageous Effects of Invention

As has been explained above, according to the present invention, the users of the first user group are able to confer an advantageous situation for the progression of the second game by expending predetermined values which they possess. On the other hand, by satisfying the predetermined benefit condition, the users of the second user group are able to confer predetermined benefits upon the users of the first user group who have expended the predetermined values. Due to these features, it is possible for the first user group and the second user group, which are different, both to participate mutually in the progression of the game.

DESCRIPTION OF EMBODIMENT

Figure 1:
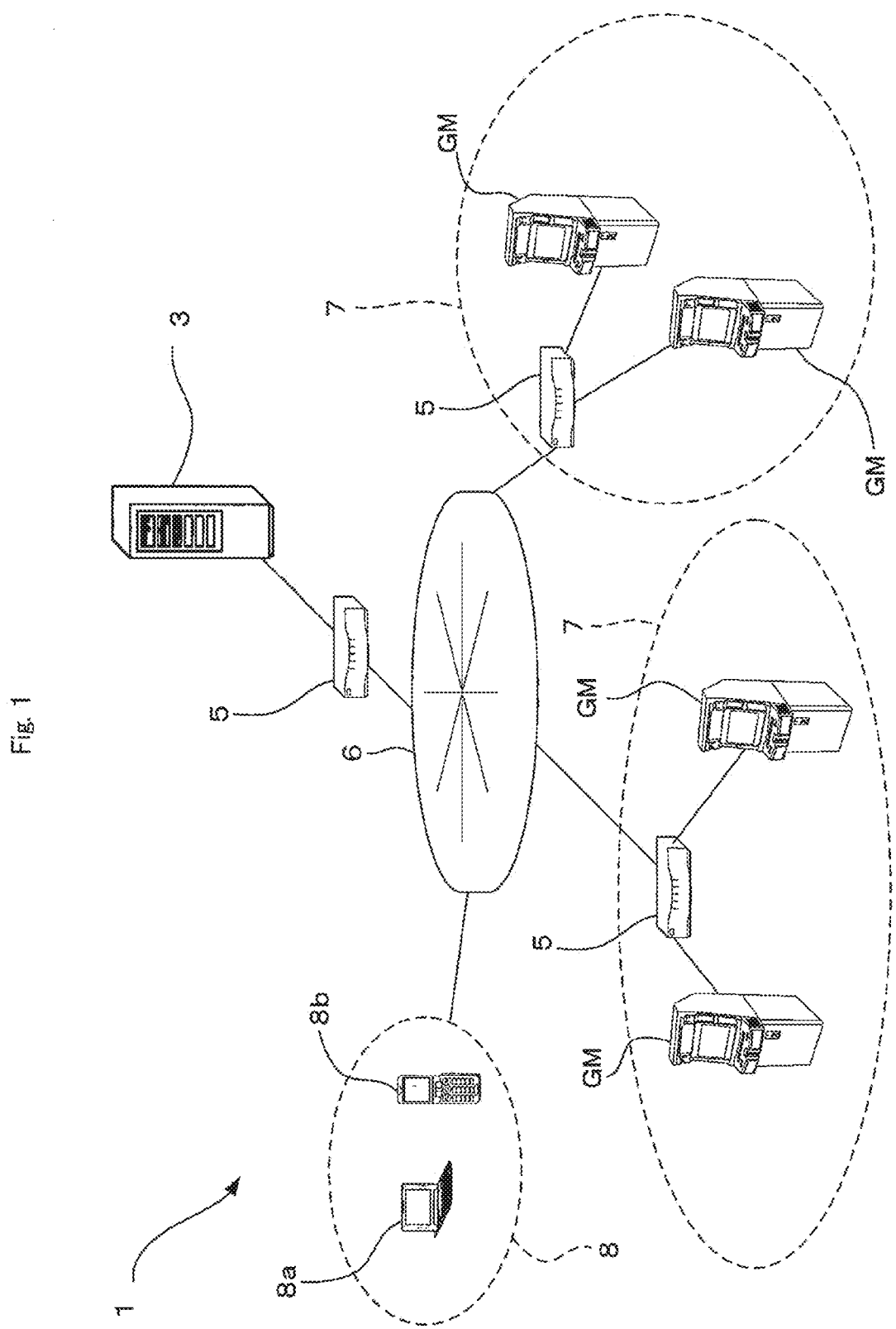
FIG. 1 shows a summary of the overall structure of a game system according to an embodiment of the present invention.

An embodiment of a game system according to the present invention will now be explained in the following. FIG. 1 is a figure showing a summary of the overall structure of the game system according to this embodiment of the present invention. As shown in FIG. 1, in this game system 1, a plurality of game machines GM that serve as the "second game terminals" and a center server 3 that serves as the "server device" are all connected to a network 6 via routers 5. These game machines GM are commercial game machines (i.e. game machines for business use) that, in exchange for payment of a predetermined consideration (i.e. payment of a predetermined price), enable users to play games within a range corresponding to that consideration. Appropriate numbers of the game machines GM are installed in each of several business establishments such as amusement arcades 7.

Incidentally, it should be understood that it would also be acceptable for local servers to be installed between the game machines GM and the routers 5, and for the game machines GM to be connected via these local servers so as to be capable of communication with the center server 3. Moreover, the center server 3 is not limited to the example in which it consists of a single physical device. For example, it would also be acceptable to build a single logical center server 3 from a server group consisting of a plurality of physical devices. Furthermore, it would also be possible for the center server 3 to be logically constituted using cloud computing. Yet further, it would also be acceptable to arrange for one of the game machines GM to function as the center server 3. The internet may, for example, be employed as the network 6. Or, alternatively, a cable or a wireless network (including the portable telephone network) may be employed for the network 6.

Moreover, in this game system 1, access to the center server 3 can be performed via the network 6 from user terminals 8 that serve as first game terminals. A computer device that is capable of network connection, such as, for example, a personal computer 8a or a portable telephone 8b (including a smartphone) may be appropriately used as one of these user terminals 8. Incidentally, it should be understood that sometimes, in this specification, when a user uses one of the game machines GM, or when he executes a predetermined game upon one of the user terminals 8, that user will be termed a "player".

Unique information is attached to the game machines GM and to the center server 3 by which each of them can be identified upon the network 6. Due to this, in this game system 1, it is possible to identify each of the game machines GM and the center server 3. IP addresses, for example, may be used as unique information of this type. If the network 6 is a network such as the internet that is open to the public, then a unique fixed address upon the network 6 is set for each of the routers 5. And a private address for uniquely recognizing the game machines GM and so on upon the network 6 is set as the IP address for each of the game machines GM and so on. Moreover, in this case, a virtual private network (VPN) is set up between the game machines GM and the center server 3, and each of the game machines GM and so on is uniquely specified upon this VPN by using its private address. In the following, information for identifying each of the game machines GM, the center server 3, and the user terminals 8 upon the network 6 will be termed "address information". It will be supposed that, in communication via the network 6, the opposite party with which communication is to be performed is specified on the basis of this address information, absent particular statement to the contrary.

Furthermore, with this game system 1, separately from the address information described above, a unique arcade ID is set for each of the amusement arcades 7, and a unique chassis ID is set for each of the game machines GM. By receiving the arcade ID and the chassis ID from the game machine GM that is the opposite party in communication, the center server 3 is able uniquely to specify the amusement arcade 7 to which the game machine which is this opposite party in communication belongs, and also is able to specify this game machine GM.

The center server 3 provides services of various types via the network 6 to the game machines GM and to their users (i.e. players) who constitute the "second user group". For example, the center server 3 provides various type of game machine services to the game machines or to their players. As game machine services, for example, there are provided the services of receiving identification information of players from the game machines GM and of authenticating those players. Moreover, the services of storing play data received from the game machines GM for players who have been authenticated, or of providing stored play data to the game machines GM, are also provided. Furthermore, the service of updating the programs or data of the game machines GM via the network 6, the service of matching users together when a plurality of users are playing a common game via the network 6, and so on, are also included in the game machine services.

Yet further, the center server 3 also provides web services of various types to users of the user terminals 8 who perform access via the network 6, and who constitute the "first user group". As such web services, for example, a service of playing a predetermined game according to access from a user terminal 8, or a game information service of providing information of various types to a user related to a game that is to be executed upon a game machine GM or upon a user terminal 8, may be provided. Furthermore, a community service of providing a place for exchange of information by users, i.e. for generation, interchange, and sharing of information, a service of allocating user IDs for identifying users, a service for correlating these user IDs with card IDs that will be described hereinafter, and so on, are also included in these web services. Incidentally, it should be understood that, in the following, in some cases, the game that is to be executed by a game machine GM and that serves as the "second game", and the game that is to be executed upon a user terminal 8 and that serves as the "first game", will be distinguished by terming the former an "arcade game", and by terming the latter a "mobile game".

Even further, in the center server 3, there is provided a charging service function of charging a fee as a consideration for providing a chargeable service, and of collecting this fee from the user. Per se known techniques of various types may be employed for this kind of charging function. For example, in order to implement such a charging service, an account for virtual money may be provided on the center server 3 for each user. In this case, for example, when a user pays a charge by using a settlement means such as cash or a credit card, then an amount of virtual money corresponding to that charge is credited to the account of that user. On the other hand, when a user makes use of a chargeable service, then an amount of virtual money corresponding to the usage charge is consumed from the account of that user. This is one example of how the charging service function may be implemented.

Figure 2:
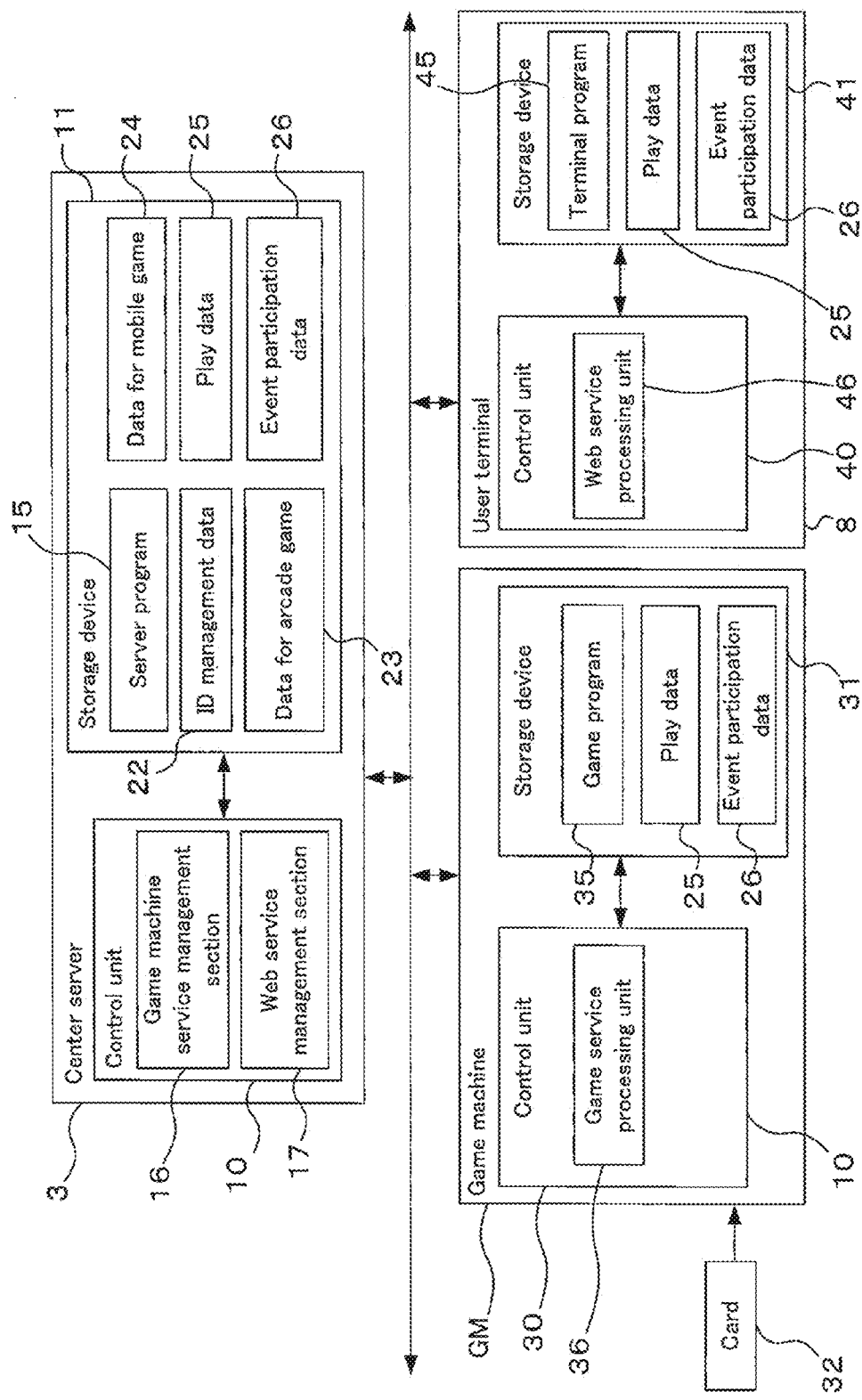
FIG. 2 is a functional block diagram of principal portions of this game system.

Next, the structure of the main portions of a control system related to the game machines GM, the center server 3, and the user terminals 8 will be explained with reference to FIG. 2. FIG. 2 is a functional block diagram of the principal portions of the game system 1. As shown in FIG. 2, a control unit 10 serving as a computer and a storage device 11 are provided to the center server 3. The control unit 10 is built as a computer unit in which a microprocessor and peripheral devices of various types required for the operation of this microprocessor such as internal storage devices (for example, a ROM and a RAM) are combined. Incidentally, it should be understood that, while input devices such as a keyboard and output devices such as a monitor are connected to the control unit 10, these are omitted from the drawings.

The storage device 11 is connected to the control unit 10. The storage device 11 consists of a high capacity storage medium of a type that can maintain storage even without provision of power, such as, for example, a magnetic tape. A server program 15 is stored in the storage device 11. This server program 15 is a computer program that is required for the center server 3 to provide services of various types to the game machines GM and to the user terminals 8. By the control unit 10 reading in and executing this server program 15, a game machine service management section 16 and a web service management section 17 are provided internally to the control unit 10.

The game machine service management section 16 executes processing for providing the game machine services described above. On the other hand, the web service management section 17 executes processing required for providing the web services described above. The game machine service management section 16 and the web service management section 17 are logical devices that are implemented as combinations of computer hardware and computer programs. It should be understood that, while other logical devices of various types are also implemented interior to the control unit 10, these are omitted from the drawings.

Furthermore, data of various types that can be referred to during execution of the server program 15 is stored in the storage device 11. For example, ID management data 22, data 23 for arcade games, data 24 for mobile games, play data 25 that serves as the "value data", and event participation data 26 are included in these various types of data. The details of these various types of data will be described hereinafter.

On the other hand, a control unit 30 and a storage device 31 are provided to each of the game machines GM. The control unit 30 is built as a computer unit consisting of a combination of a microprocessor and peripheral devices of various types required for the operation of that microprocessor, such as an internal storage device (as one example, ROM and/or RAM). Incidentally, it should be understood that, in a similar manner to the case with a per se known game machine, input and output devices of various types, such as an operation input device that inputs operation by the player, a display device such as a monitor, an audio reproduction device such as a speaker, a card reader, and a coin authentication device are provided to the control unit 10, but these are not shown in the drawings.

It should be understood that the card reader is provided in order to read in information upon a card 32 which the user possesses, and in order to output a signal corresponding to this information to the control unit 30. On this card 32, there is provided a nonvolatile storage medium (not shown in the drawing) such as an IC chip and a magnetic stripe. And a unique ID (in the following, sometimes this is termed the "card ID") or the like for each card 32 is stored upon this storage medium. The card ID may, for example, be employed for calling up play data 25 stored on the center server 3. The center server 3 identifies the user (i.e. the player) by using the unique user ID for each user. Play data 25 is recorded in one-to-one correspondence with these user IDs. The card ID may correspond to the user ID on a one-to-one basis, or on a many-to-one basis. By referring to the ID management data 22, the center server 3 is able to determine the correspondence relationship between the card ID and the user ID, and to specify the user ID of the player. It should be understood that it would also be acceptable for the card ID to be recorded upon the card 32 in a bar code format or the like. Or it would also be acceptable for the card ID to be recorded upon a storage medium such as an IC chip or the like which is provided in a portable telephone, instead of upon a card 32.

The storage device 31 is connected to the control unit 30. The storage device 31 is, for example, built from a hard disk or a flash SSD (Solid State Drive) or the like, so that it is capable of maintaining storage even if it is not provided with power. A game program 35 is stored in the storage device 31. The game program 35 is a computer program that is required for the game machine GM to provide the arcade game. The game service processing unit 36 is provided in the interior of the control unit 30 by the control unit 30 reading in and executing the game program 35.

The game service processing unit 36 executes processing of various types related to playing of the arcade game on the game machine GM, i.e. to management of the start, the progression, and the end of the arcade game, and processing related to collection of the playing charge (i.e. to collection of a predetermined consideration). Furthermore, a part of the game machine services is implemented by cooperation between the game service processing unit 36 and the game machine service management section 16 of the center server 3. The game service processing unit 36 is a logical device that is implemented by a combination of computer hardware and a computer program.

Furthermore, data of various types that can be referred to during the execution of the game program 35 is stored in the storage device 31. For example, the play data 25 and the event participation data 26 are included in these various types of data. During execution of the arcade game, at least a portion of the play data 25 is provided from the center server 3, and is stored in the storage device 31, and this includes a portion corresponding to the player who is executing the subject arcade game. In a similar manner for the event participation data 26, if an event such as a mission is being executed in the arcade game, then at least a portion of the event participation data 26 is provided from the center server 3, and is stored in the storage device 31, and this includes a portion that corresponds to that event. The details of these types of data will be described hereinafter.

Furthermore, a control unit 40 and a storage device 41 are provided to each of the user terminals 8. The control unit 40 is built as a computer unit consisting of a combination of a microprocessor and peripheral devices of various types required for the operation of that microprocessor, such as an internal storage device (as one example, ROM and/or RAM). Incidentally, it should be understood that input and output devices of various types that are provided to a per se known computer device that is capable of network connection are provided to the control unit 40, but these are not shown in the drawings.

The storage device 41 is connected to the control unit 40. The storage device 41 may, for example, built from a hard disk or a flash SSD (Solid State Drive) or the like, so that it is capable of maintaining storage even if it is not provided with power. A terminal program 45 is stored in the storage device 41. The terminal program 45 is a computer program that is necessary for the user terminal 8 to provide the mobile game and so on. The web service processing unit 46 is provided in the interior of the control unit 40 by the control unit 40 reading in and executing the game program 45.

In cooperation with, for example, the web service management section 17 of the center server 3, the web service processing unit 46 executes processing for enabling the user to employ web services. As one example of such web services, the web service processing unit 46 performs per se known processing for providing a mobile game to the user in cooperation with the web service management section 17. Moreover, as another example of a web service, the web service processing unit 46 also performs per se known processing in order to provide a community service. The web service processing unit 46 is a logical device that is implemented by a combination of computer hardware and a computer program.

Furthermore, data of various types that can be referred to during execution of the terminal program 45 is stored in the storage device 41. For example, play data 25 and event participation data 26 are included in this data of various types. During execution of the mobile game, at least a portion of the play data 25 is provided from the center server 3, and is stored in the storage device 41, and this includes a portion corresponding to the player who is executing the subject mobile game. The details of these types of data will be described hereinafter.

Next, the relationship between an arcade game that is executed by the game machine GM and a mobile game that is executed by the user terminal 8 will be explained. As the arcade game and as the mobile game, various types of games may be executed. As one example, as the arcade game, an action game may be executed by the game machine GM. Moreover, as one example, as the mobile game, a role playing game may be executed by the user terminal 8, this being different from the arcade game. In this case, for compatibility with the input device that is provided to the user terminal 8, the role playing game may be a command type game in which the game progresses by, for example, input of single-button commands. As the arcade game and as the mobile game, it would be possible for games of different types to be executed; or, alternatively, it would also be possible for games of the same type to be executed.

Moreover, in some cases, even if games of different types are executed, both of the games may provide world views having the same details. The "world views having the same details" mean that some of the factors in the two games are the same, such as currencies that are used in the games, points that can be obtained by successfully completing certain predetermined missions, items that can be used in the games, or fields that are used in the progression of the games. In other words games can be provided as the arcade game and as the mobile game in which, even though the games are of different types, it is possible to use money, items, or the like that appear in the games in common between the two games. With games having a common world view of this type, or with games of the same type, it is arranged for a player of one of the games to be capable of participating in the progression of the other game.

Figure 3:
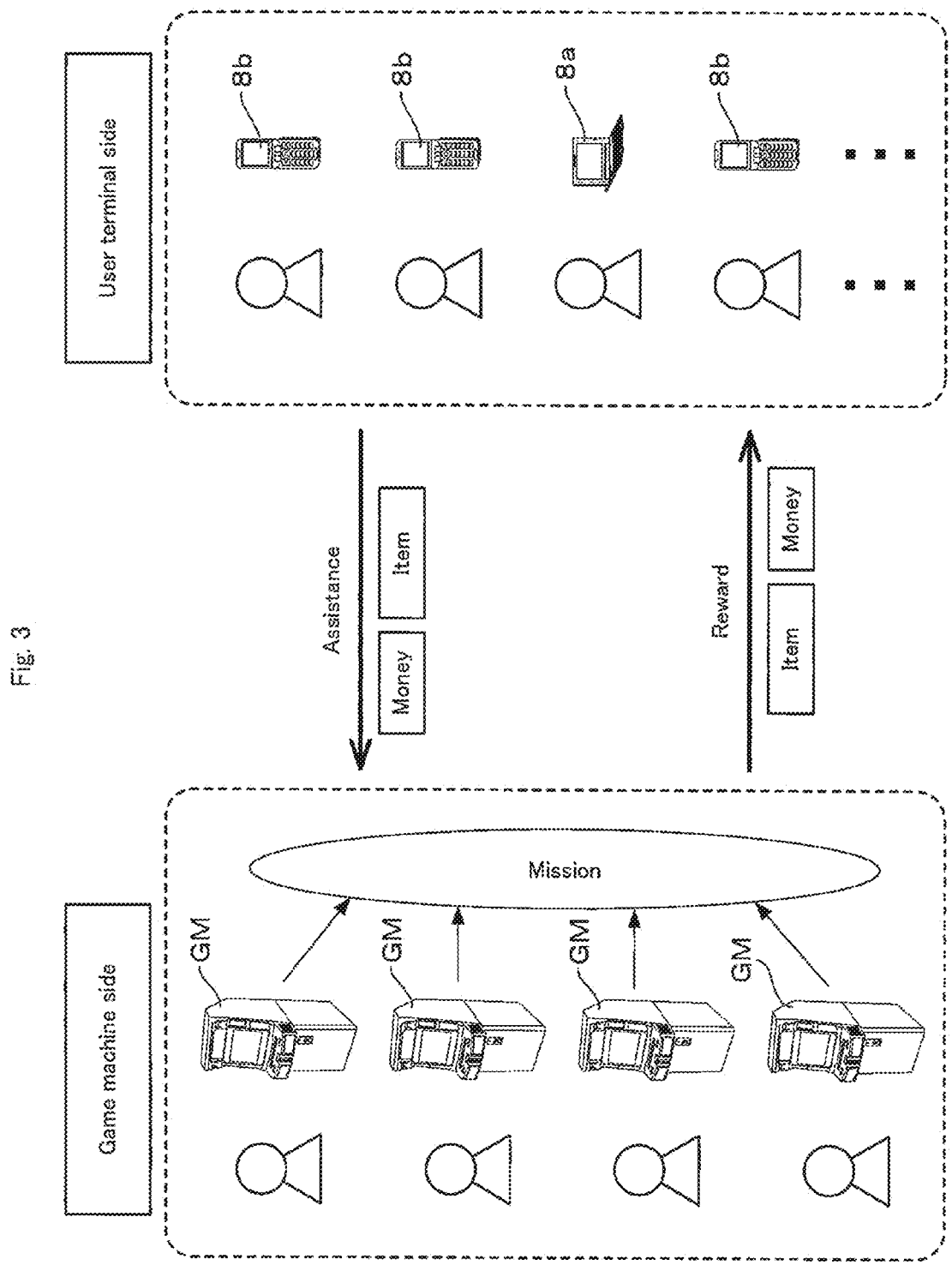
FIG. 3 is an explanatory figure for explanation of an example in which a player of a mobile game participates in a mission that is to be performed by a player of an arcade game.

Now, referring to FIG. 3, a case in which the player of one of the games participates in the progression of the other game will be explained. For example, the player of one of the games may participate according to a format in which he assists in a mission or the like that is to be performed by the player of the other game. FIG. 3 is an explanatory figure for explanation of an example when the player of the mobile game assists in a mission that is to be performed by the player of the arcade game. Moreover, in the example of FIG. 3, a case is shown in which, as the arcade game, an action game is executed in which four players are trying to complete a common mission. As shown in FIG. 3, each user of a user terminal 8 is able, via his user terminal 8, to assist in the mission which is being executed in the arcade game by dedicating at least a portion of the property that he himself owns, for example funds such as money or points, or by dedicating items that are effective for accomplishment of the mission or the like. In this case, the property such as funds or items with which assistance is given (that is, things (i.e. game factors) that can be used in common in both games) functions as the "predetermined value".

Moreover, with this assistance, the property with which assistance is to be given is transferred to one or more players in the arcade game. In other words, its state is changed from the state of being owned by the player giving assistance to the state of being owned by the player receiving assistance. That is to say, when the assistance is rendered, the property with which assistance is being given is expended from the property that the helper himself owns, so that the amount thereof is thereby reduced. Due to this, the property with which assistance has been rendered ceases to be capable of being used in the mobile game (in the case of money or the like, the amount thereof is reduced by an amount corresponding to the sum that has been given for assistance, and it becomes impossible to use this portion). Incidentally, it should be understood that assistance could also be given with a combination of several things, such as funds and items.

As described above, the property with which assistance is to be given is transferred to the players that are to be the subjects of assistance. In other words, along with the assistance (i.e. the expenditure of property) rendered by the users of the user terminals 8, the beneficial situation of increase of the property that corresponds to this assistance is conferred upon the players serving as specified second users of the game machines GM that are to be assisted. Since at least the world view is common to the arcade game and to the mobile game, accordingly the funds and/or items with which assistance has been provided from the players of the mobile game can also be utilized in the arcade game. In other words, the users on the game machine GM side can use the funds or the like with which assistance has been provided in order to complete their mission which serves as the "predetermined benefit condition", in the arcade game. Accordingly, if assistance by the players of the mobile game is given, the probability that the players of the arcade game will complete their mission is elevated. Incidentally, it should be understood that the funds or the like with which assistance is provided may be allocated equally between the players of the arcade game, or alternatively, if there is a leader or the like or a representative of the mission, it would also be possible to provide all the funds to that representative only.

The mission to be executed in the arcade game is notified to each of the user terminals 8 via the center server 3. Moreover, on the basis of notification from the center server 3, the service of soliciting assistance for the mission is provided through each of the user terminals 8. For example, in addition to specification of participation or non-participation, specifying the subject for the assistance by each player, such as with money or one or more items, is also included in soliciting assistance. This type of soliciting assistance may, for example, be performed via an event participation screen that is provided upon the user terminal 8. In principle, the thing that is specified as being the subject of assistance will be expended irrespective of whether or not the mission is successfully accomplished. In other words, as the price for participation in the arcade game, the player upon each of the user terminals 8 takes the risk that he will lose the subject of assistance.

On the other hand, if the mission in which the players on the user terminal 8 side have assisted is completed, then a reward corresponding to the value of the assistance is given to each of them as a predetermined benefit. For example, an item or money or the like may be obtained as this reward corresponding to the value of the assistance. These rewards are greater than the value of the money or the like that was employed for the assistance. Or, the rewards may also be items or the like that cannot be obtained within the mobile game. Moreover, the value of these rewards may be set so as to be higher, the higher was the value of the assistance. In other words, the assistance by the user of each of the mobile terminals 8 corresponds to an investment for possibly receiving a reward thereafter. Accordingly, if the user who receives assistance is the same as the user who gives the assistance, then this does not constitute an investment. In other words, in this type of event, at least portions of the set of players of the arcade game who are performing the mission and the set of users of the user terminals 8 who are assisting them are different groups of users (it would also be acceptable to arrange for a portion of the assistance side to participate in performing the mission). In this manner, a mutual assistance event is generated in which the players of the arcade game and the players of the mobile game mutually join together and participate in the progression of the game, and each of the players is able to assist the others mutually in the progression of the game.

Incidentally, it should be understood that it would also be possible for information about the players who are to execute the mission to be included in the notification to the user terminals 8. In this case, the player on each of the user terminals 8 is able to assess the possibility of successful accomplishment of the mission on the basis of this information about the players. For example, information related to cumulative playing time, the record of past missions, or the money and/or items possessed may be employed as information of this type. Furthermore, the reward when the mission has been successful may vary according to the mission, or according to the players who perform the mission. For example, if the mission is simple and easy, or in the case of a player for whom the possibility of success is high, the possibility of obtaining the reward is high. Accordingly, the number of players who desire to assist in the mission may also increase. In other words, depending upon the details of the mission (for instance, its degree of difficulty) or the capabilities of the players, a lack of balance may occur in the players who desire to assist in the mission. In order to eliminate this lack of balance, for example, it is also possible to arrange for the details of the reward to vary, so that, the higher the degree of difficulty of the mission becomes, the higher the value of the reward that can be obtained becomes. Or it would also be acceptable to arrange for the details of the reward that can be obtained to vary according to the number of players who wish to assist in the mission, so that, if the number of players who wish to assist is low, then the value of the reward per player becomes higher, while, if this number is high, then this value becomes lower. And the details of this varying reward may be notified to the user terminals 8. Furthermore, it would be possible for the number of players who wish to assist in the mission to be limited; or it would also be possible for this number not to be limited.

Next, the details of the ID management data 22, the arcade game data 23, the mobile game data 24, the play data 25, and the event participation data 26 will be explained. The ID management data 22 is data in which ID correspondence relationships of various types that are used in the game system 1 are described. For example, as described above, the correspondence relationship between card IDs and user IDs is recorded in the ID management data 22.

The play data 25 is a set of data created for each user ID. When a player plays an arcade game on any one of the game machines GM, then the card ID of that player is recognized upon that game machine GM and is provided to the center server 3. And at least a portion of the play data 25 that corresponds to the user ID corresponding to this card ID is provided from the center server 3 to the game machine GM, and is stored in the storage device 31 of that game machine GM.

Figure 4:
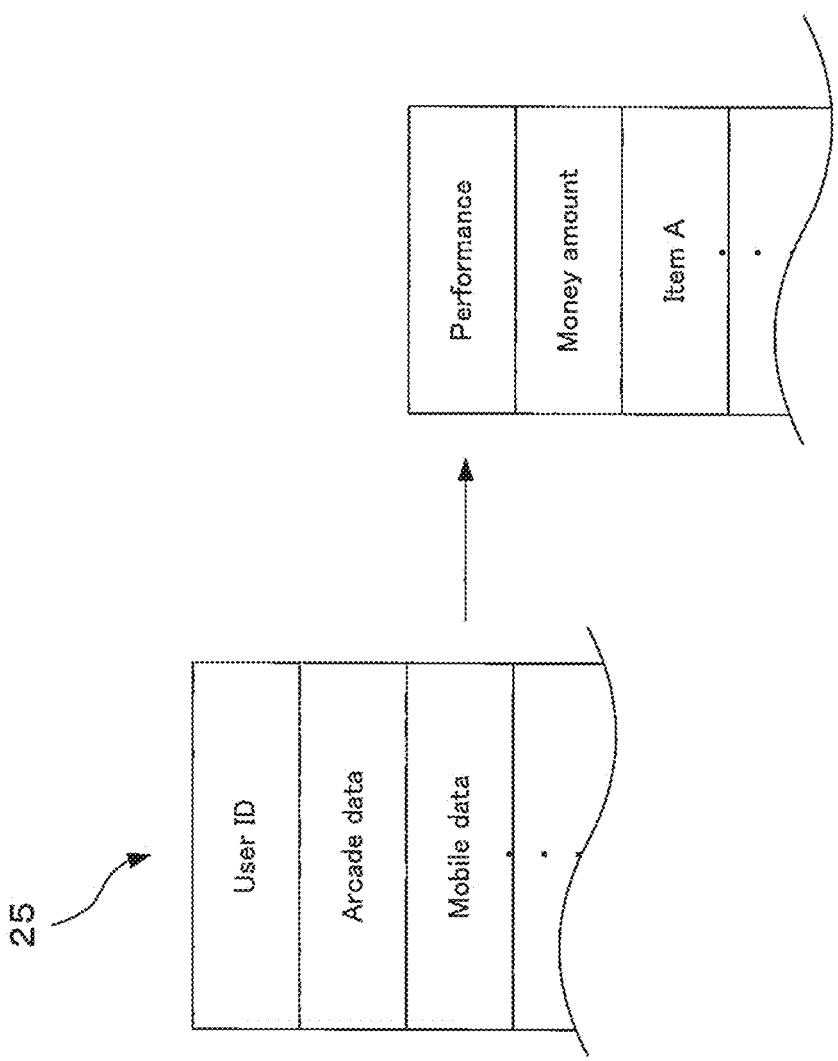
FIG. 4 is a figure showing an example of details of play data.

FIG. 4 is a figure showing an example of the details of the play data 25. As shown in FIG. 4, arcade data and mobile data are described in the play data 25 in correspondence to user IDs. Information is included in the arcade data relating to the play in the arcade game, such as performances in the arcade game that the user has recorded, or items that he has acquired or money that he possesses within the arcade game. On the other hand, information is included in the mobile data relating to the play in the mobile game, such as performances in the mobile game that the user has recorded, items that he has acquired or money that he possesses within the mobile game. Furthermore, among the user IDs, the user ID for identifying the user of the user terminal 8 functions as the "first user information". Incidentally, it should be understood that a plurality of games may be employed for the arcade game and for the mobile game. In this case, these games may be managed with a unique ID for each of the arcade games, or with a unique ID for each of the mobile games. Moreover, correspondence between the arcade data and the mobile data and the user IDs in the play data 25 may be established by employing the game IDs.

Figure 5:
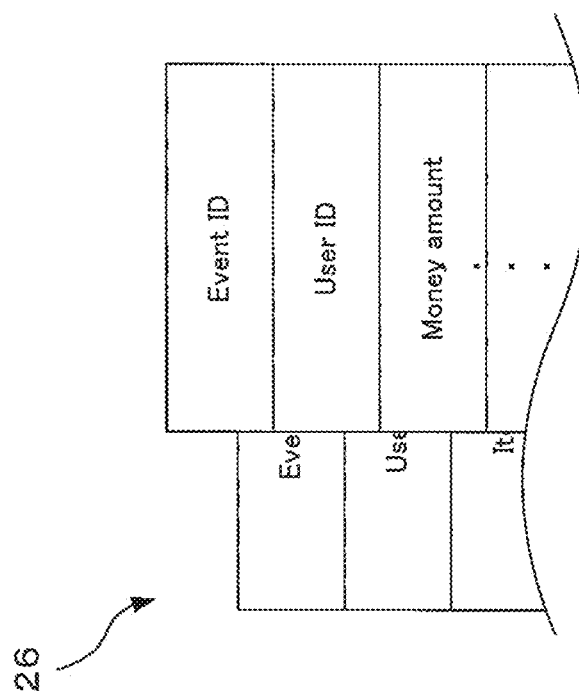
FIG. 5 is a figure showing an example of details of event participation data.

The event participation data 26 is a set of data that is generated for each event ID and also for each user ID. Moreover, the event IDs are used for identifying mutual assistance events. Accordingly, as the event IDs, a unique ID is utilized for each mutual assistance event. The relationship of correspondence between mutual assistance events and event IDs is, for example, specified in the ID management data 22 described above, and is managed with the ID management data 22. FIG. 5 is a figure showing an example of the details of the event participation data 26. As shown in FIG. 5, information specifying correspondence between event IDs, user IDs of users who participate in mutual assistance events corresponding to those event IDs as players giving assistance, and subjects with which those users give assistance (for example, amounts of money, items, or the like) is included in the event participation data 26.

The arcade game data 23 is data relating to the arcade game that is to be executed by the game machines GM, and is referred to by the control unit 10 of the center server 3, as appropriate. On the other hand, the mobile game data 24 is data relating to the mobile game that is to be executed by the user terminals 8, and is referred to by the control unit 10 of the center server 3, as appropriate. The ID management data 22, the play data 25, and the event participation data 26 described above can also function as portions of the arcade game data 23 and of the mobile game data 24. A plurality of types of the arcade game data 23 and the mobile game data 24 can be prepared corresponding to games of different types. Incidentally, it should be understood that, while data of various types other than the data shown in the figures is also recorded in the storage devices 11, 31, and 41, explanation thereof will be omitted.

Next, processing of various kinds executed in correspondence to mutual assistance events will be explained with reference to FIGS. 6 through 9. Incidentally, it should be understood that although, apart from the routines of FIGS. 6 through 9, the control units 10, 30, and 40 also execute processing of various per se known types, detailed explanation thereof will here be omitted. This omitted processing may include, for example, processing for authenticating a user on the basis of his user ID, processing for charging money, processing for providing the mobile game, and so on.

Figure 6:
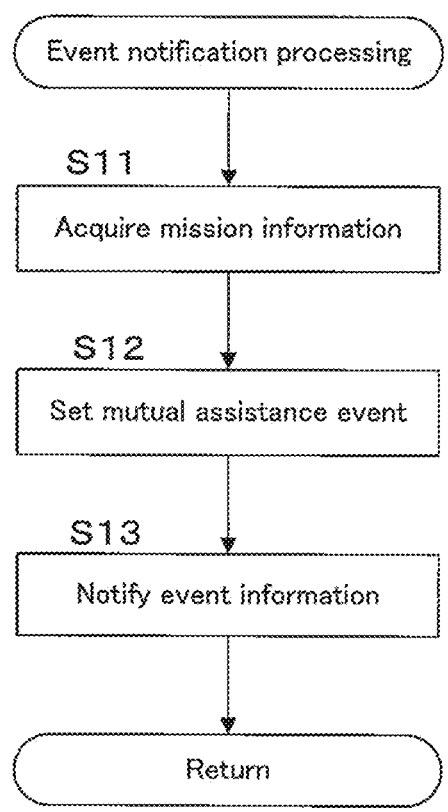
FIG. 6 is a figure showing an example of a flow chart of an event notification processing routine.

FIG. 6 is a figure showing an example of a flow chart for an event notification processing routine. The routine of FIG. 6 is performed in order to set up a mutual assistance event, and to notify each of the user terminals 8. The routine of FIG. 6 is executed by the control unit 10 of the center server 3 via the web service management section 17. Moreover, the routine of FIG. 6 is executed each time a predetermined mission (for example, one which is set up in advance as a subject event, or the like) is arranged. Furthermore, the arrangement of the predetermined mission may, for example, be notified to the game machines GM. This notification may, for example, be executed each time the execution is arranged of the predetermined mission such as the mission that is set up in advance. Moreover this notification may, for example, be sent by the control unit 30 via the game service processing unit 36. Or, the web service management section 17 may decide, upon the basis of information from the game machines GM, as to whether or not there is a predetermined mission.

When the routine of FIG. 6 starts, in a first step S11, the web service management section 17 acquires, from each of the game machines GM, mission information related to the mission whose execution will be arranged. For example, information specifying the details of the mission (its degree of difficulty and so on), the number of players who are to perform it, the date and time arranged for it to be performed, the players who are to perform the mission, or the like may be included in this mission information.

Next, in a step S12, the web service management section 17 sets a mutual assistance event on the basis of the mission information that was acquired in the step S11. Processing is included in this setting such as, for example, acquiring an event ID that corresponds to this mutual assistance event. And in the next step S13 the web service management section 17 notifies event information relating to the event that has been set up in the step S12, to each of the user terminals 8. This event information may, for example, include the mission information that has been acquired in the step S11 and the event ID that has been acquired in the step S12. When the processing of the step S13 is completed, the web service management section 17 terminates this instance of this routine. Due to this, a mutual assistance event is set up for the mission that is to be executed in the arcade game, and the details thereof are supplied to the user who is using each of the user terminals 8.

Figure 7:
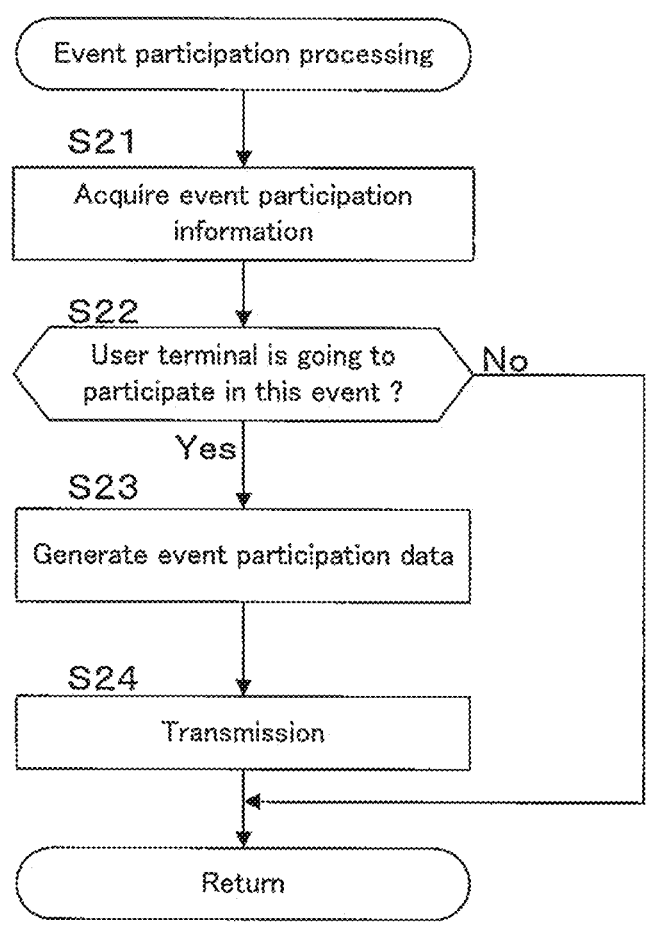
FIG. 7 is a figure showing an example of a flow chart of an event participation processing routine.

FIG. 7 is a figure showing an example of a flow chart for an event participation processing routine. The routine of FIG. 7 is executed in order to specify the users who are to participate in a mutual assistance event, and the subjects that are to be invested in this event. The routine of FIG. 7 is executed by the control unit 40 of the user terminal 8 via the web service processing unit 46. Moreover, for example, after event information has been notified from the center server 3, the routine of FIG. 7 may be repeated on a predetermined cycle. Furthermore, it would also be acceptable for this routine to be executed at a target date and time that are included in the event information. Or it would also be possible for this routine to be executed each time event participation registration is performed by the user terminal 8. Event participation registration may, for example, be performed via an event participation screen upon which it is possible to register whether or not to participate, and the subject to be invested (money, items, or the like). Moreover, this event participation screen may be provided by processing of a per se known type. It will be acceptable to arrange for the web service processing unit 46 to perform this per se known processing; or, alternatively, it may be performed by the web service management section 17.

When the routine of FIG. 7 starts, in a first step S21 the web service processing unit 46 acquires event participation information that has been registered, for example, via an event participation screen or the like. Information related to whether or not this terminal will participate, and, in the case of the participation, the subject to be invested in this event (for example, money or items or the like) may, for example, be included in this event participation information. In the next step S22, on the basis of the event participation information acquired in the step S21, the web service processing unit 46 determines whether or not this user terminal is going to participate in this event. This determination may, for example, be performed on the basis of information included in the event information related to whether or not this terminal will participate, or on the basis of whether or not event participation information is present. And, if the result of this determination is negative, in other words if this terminal will not participate in the event (or if no event participation information exists), then the subsequent processing is skipped, and this instance of the routine terminates. On the other hand, if the result of the determination in the step S22 is affirmative, in other words if this terminal will participate in the event, then the web service processing unit 46 proceeds to the step S23.

In the step S23, the web service processing unit 46 generates event participation data 26 on the basis of the event participation information. And in the next step S24 the web service processing unit 46 transmits the event participation data 26 generated in the step S23 to the center server 3, and then terminates this instance of the routine. Due to this, whether or not each user will participate, and the subject of his investment, are specified. Moreover, the event participation data 26 that has been transmitted is stored in the storage device 11.

Incidentally, it should be understood that, in the routine of FIG. 7, if this terminal will not participate in the event, then the processing for generating event participation data 26 in the step S22 is skipped. In other words although in this case event participation data 26 is not generated if this terminal will not participate in the event, this feature is not to be considered as being limitative. For example, it would also be acceptable to omit the step S22, and, even though this terminal will not participate in the event, to generate event participation data whose details show that this terminal will not participate in the event. Furthermore, if an event participation screen is provided by the web service management section 17, then it would also be possible for the routine of FIG. 7 to be executed by the web service management section 17. In this case, the processing for transmitting the event participation data to the center server 3 (i.e. the step S24) could be omitted.

Figure 8:
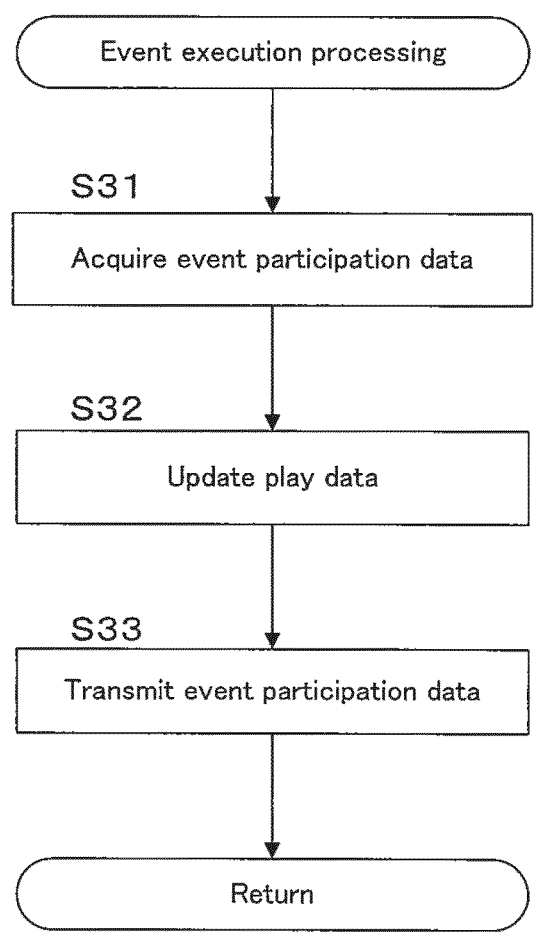
FIG. 8 is a figure showing an example of a flow chart of an event execution processing routine.

FIG. 8 is a figure showing an example of a flow chart for an event execution processing routine. The routine of FIG. 8 is executed in order to implement investment by users of the user terminals 8 who are participating in a mutual assistance event. In more concrete terms, the routine of FIG. 8 is executed in order to change from a state in which the investment subjects of users who are participating in a mutual assistance event belong to those users, to a state in which they are owned by the users of the game machines GM who are performing the mission. The routine of FIG. 8 is executed by the control unit 10 of the center server 3 via the web service management section 17. Moreover, the routine of FIG. 8 is executed at a predetermined timing (for example, a target date and time that is included in the event information may be set as a reference).

When the routine of FIG. 8 starts, the web service management section 17 acquires the event participation data 26 stored in the storage device 11. And in the next step S32 the web service management section 17 updates the play data 25 on the basis of the event participation data that has been acquired in the step S31. In concrete terms, according to the details of the event participation data 26, the web service management section 17 on the one hand reduces the investment subjects such as the amount of money or the items invested by the users of the user terminals 8, and also increases the amount of money or the like corresponding to these investment subjects of the players who are to execute the mission. In other words, the play data 25 is updated so that the investment subjects are expended from the property possessed by the users who make the investments, and so that the investment subjects are added to the property possessed by the users who receive the investment.

Next, in a step S33, the web service management section 17 transmits the event participation data 26 to the game machines GM, and then this instance of the routine terminates. Due to this, the amount of money or the like invested by the users of the user terminals 8 is taken away from the play data 25 of those users, while amounts of money or the like corresponding to these amounts of decrease or the like are added to the play data 25 of the players who are to execute the mission. In other words, the subjects of investment by the users of the user terminals 8 are changed from being property that is possessed by those users to being property that is possessed by the players who are to execute the mission. Assistance by the users of the user terminals 8 to the players who are to execute the mission is implemented in this manner. Furthermore, the event participation data 26 that is transmitted to the game machines GM is stored in the storage devices 31. Moreover, for example, the event participation data 26 is utilized by the game machines GM for notification of the players giving assistance, notification of rewards after the mission has been performed, and so on.

Figure 9:
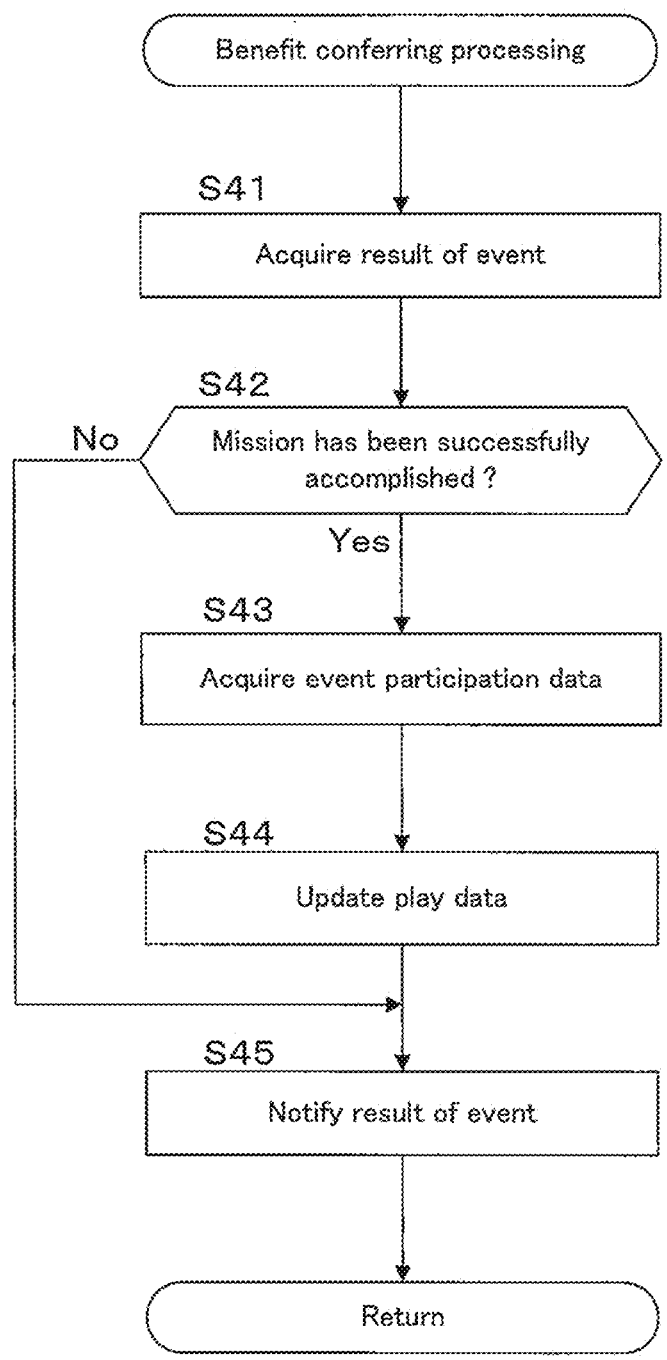
FIG. 9 is a figure showing an example of a flow chart of a benefit conferring processing routine.

FIG. 9 is a figure showing an example of a flow chart for a benefit conferring processing routine. In a mutual assistance event, as a benefit for the successful accomplishment of a mission or the like or the success of the event, the routine of FIG. 9 is executed in order to confer a reward upon a user who has given assistance. The routine of FIG. 9 is executed by the control unit 10 of the center server 3 via the web service management section 17. Moreover, the routine of FIG. 9 is executed each time a mission that is the subject of a mutual assistance event ends. Furthermore, the ending of a mission may, for example, be notified by a game machine GM. This notification may be performed, for example, each time the game service processing unit 36 ends a mission.

When the routine of FIG. 9 starts, in a first step S41, the web service management section 17 acquires information related to the result of the event from a game machine GM. Information related to the successful accomplishment of the mission or to its failure, or, if a time period limitation or the like or some peculiar condition for the event is set, then information related thereto, may, for example, be included in this information related to the result of the event.

Next, in a step S42, on the basis of the information related to the event result acquired in the step S41, the web service management section 17 determines whether or not the mission of the subject event has been successfully accomplished. If the result of this determination is negative, in other words if the mission has not succeeded, then the web service management section 17 skips the processing of a step S43 and of a step S45, and proceeds to the step S45. On the other hand, if the result of this determination is affirmative, in other words if the mission has been concluded successfully, then the web service management section 17 proceeds to the step S43.

In the step S43, the web service management section 17 acquires the event participation data 26. And in the next step S44, on the basis of the event participation data 26 acquired in the step S43, the web service management section 17 updates the play data 25 so that rewards are given to each of the users who invested in this event as benefits for success of the mission. If, for example, the rewards consist of gifts of money, then this updating is performed so that the money amount of each user who has invested in the mission increases, corresponding to the money amount which is conferred as the rewards.

Next, in a step S45, the web service management section 17 notifies the result of the event to the user terminals 8. If, for example, the event has succeeded, then this notification includes information that specifies that the event has succeeded and also the reward. On the other hand, if it has not been possible for the event to succeed, then information specifying failure of the event is included. When the processing of the step S45 has been completed, the web service management section 17 ends this instance of the routine. Due to this, along with the event result being notified to the user terminals 8, also, if the mission which is the subject event has been completed successfully, then a reward is given to each of the users who had invested in this mission.

As has been explained above, according to this embodiment, the mission that is to be performed on the game machines GM is assisted by the users of the user terminals 8. Moreover, due to this assistance, the probability that the players of the game machines GM will succeed in accomplishing the mission is elevated. In other words, the user of each of the user terminals 8 is able to utilize property that he himself possesses, such as money or items, in order to provide an advantage in the progression of the game on the game machines GM. On the other hand, the user of each of the user terminals 8 obtains a reward, on the condition that the mission is successfully accomplished. In other words, by successfully accomplishing the mission, the players of the game machines GM are able, as a reward for assistance, to confer a benefit that can be utilized in the mobile game upon each of the users who have assisted them. Due to this, it is possible for the group of users of the arcade game and the group of users of the mobile game, who are different user groups, to participate mutually in the progression of the game.

Furthermore, the higher the capability to accomplish the mission successfully is, the easier is it to receive assistance. In other words, capability for playing the game of each of the players of the arcade game is evaluated, and they receive assistance according to that capability. And, by utilizing this assistance, it is possible to enhance the probability that the mission will be successfully accomplished. Due to this, for example, it is possible to make a character in the arcade game grow or the like, not only by utilizing the number of games (i.e. the playing cost) or the time played, but also by utilizing the playing capability of the player. On the other hand, it is also possible for the player of the mobile game to develop the game in an advantageous manner, not only according to the number of times of games (i.e. the playing cost) or the play time, but according to investment as well. In other words, it is possible to develop the game in an advantageous manner by employing one's capability for analysis of the details of a mission and the players who are executing it. Due to this, in addition to the number of games played, or the time played, or one's capability for playing, it is also possible to utilize one's capability for analyzing a mission or the like in the development of the game. Furthermore, this type of investment also stimulates the gambling spirit of the users. Due to the above factors, it is possible mutually to enhance the motivations for playing the arcade game and for playing the mobile game. Moreover, due to employing mutual cooperation between the arcade game and the mobile game, it is possible to enhance the interest value of both of these games.

In the embodiment described above, via the web service management section 17, the control unit 10 of the center server 3 functions as a "situation provision device" by executing the routine of FIG. 8, and functions as a "benefit conferring device" by executing the routine of FIG. 9. Moreover, the storage device 11 of the center server 3 functions as a "value data storage device" by storing the play data 25.

The present invention is not limited to the embodiment described above; it may be implemented in various ways, as appropriate. In the above embodiment, an action game was performed as the arcade game while a role playing game was performed as the mobile game. However, the games are not to be considered as being limited to this type of embodiment. It would be acceptable to employ games of various types as each of these games, such as a sports game, a shooting game, or a simulation game. Moreover, as these games, it would also be possible to perform games of mutually identical types.

Furthermore, in the embodiment described above, as the arcade game and as the mobile game, games having a common world view are executed, and game elements that can be employed in common both in the arcade game and in the mobile game are utilized as the predetermined values. However, the predetermined values are not to be considered as being limited to this embodiment. For example, it would be possible to utilize game elements that are not used in common in both the games as the predetermined values. In this case, a conversion rate could be employed for converting between the values that are the subjects of expenditure and advantageous situations that are obtained thereby. Furthermore, the predetermined values are not limited also to the game elements. For example, it would be possible for values corresponding to actual money values to be employed as the predetermined values. Accordingly, the advantageous situation is also not to be considered as being limited to the embodiment in which a predetermined value is provided corresponding to a predetermined value that is expended. In other words, a value that is different from a predetermined value that is expended may be provided as the advantageous situation. In concrete terms, if a fixed amount of money is expended as the predetermined value, then it will be acceptable to provide a value that is different from money as the advantageous situation, such as, for example, lowering the degree of difficulty, reducing the number of enemy characters (i.e. reducing the number of obstacles), or increasing the number of colleagues (adding one to the normal number of colleagues).

In the embodiment described above, completion of the mission was utilized as the predetermined benefit condition. However, the predetermined benefit condition is not limited to this embodiment. For example it would also be acceptable to employ a condition that has no relationship with the progression of the game as the predetermined benefit condition. It would be possible, for example, as the predetermined benefit condition, to employ a condition that is satisfied if the player of each of the game machines GM owns or is equipped with a predetermined combination of items, or if a specified formation is constructed during the game, or if the mission is successfully accomplished during a predetermined time period, or the like.

In the embodiment described above, a user terminal 8 was utilized as the first game terminal, and a game machine GM was utilized as the second game terminal. Moreover, the user terminals 8 include personal computers and portable telephones, and these have different configurations, compared with the game machines GM, such as a configuration in which inputs of operations are limited to the keyboards (or the small size touch panel), a configuration in which screens are comparatively small, or a configuration in which execution environments for programs are different. In other words, different platforms are used for the first game terminal and for the second game terminal. However, the game terminals are not to be considered as being limited to this type of embodiment. For example, the same platform may be employed both for the first game terminal and also for the second game terminal. In other words, it would be possible for commercial game machines to be employed both for the first game terminal and also for the second game terminal; or it would also be possible for user terminals to be employed both for the first game terminal and also for the second game terminal. Accordingly the game machine of the present invention may be implemented in any appropriate embodiment, such as that of a commercial game machine that is installed in a business establishment, that of a household game machine of a type set up in a private dwelling, or that of a portable type game machine.

The invention claimed is:

1. A game system in which a first game terminal that provides a first game to a first user group, a second game terminal that provides a second game to a second user group that is different from the first user group, and a server device that provides predetermined services to the first game terminal and to the second game terminal are connected together via a network, comprising:
    a value data storage device adapted and configured to store value data in which a correspondence between first user information for specifying first users of the first user group, and predetermined values that are possessed by the first users and that can be used in the first game, is described;
a situation provision device adapted and configured to, upon the condition that at least one first user of the first user group expends at least a portion of the predetermined value that he himself possesses, provide an advantageous situation for progression in the second game to a specified second user of the second user group; and
a benefit conferring device adapted and configured to determine that the specified second user satisfies a predetermined benefit condition comprising accomplishing a mission successfully in the second game, wherein a predetermined benefit is set so that its value is higher, the higher the difficulty of the mission, and confer the predetermined benefit that can be used in the progression of the first game, on the one first user.

2. The game system according to claim 1, wherein:
as the second game, a game in which the predetermined value can be used in common with the first game is performed; and
as the advantageous situation, the situation provision device provides a predetermined value that corresponds to the predetermined value expended by the one first user, to the specified second user.

3. The game system according to claim 1, wherein the predetermined benefit is set so that its value is higher, the higher is the predetermined value that is expended.

4. The game system according to claim 1, wherein different platforms are used for the first game terminal and for the second game terminal.

5. A control method of controlling a computer incorporated in a game system in which a first game terminal that provides a first game to a first user group, a second game terminal that provides a second game to a second user group that is different from the first user group, and a server device that provides predetermined services to the first game terminal and to the second game terminal are connected together via a network, and which comprises a value data storage device adapted and configured to store value data in which a correspondence between first user information for specifying first users of the first user group, and predetermined values that are possessed by the first users and that can be used in the first game, is described, and wherein the control method of controlling the computer comprises the steps:
a situation provision step, upon the condition that at least one first user of the first user group expends at least a portion of the predetermined value that he himself possesses, that provides an advantageous situation for progression in the second game to a specified second user of the second user group; and
a benefit conferring step, where it is determined that the specified second user satisfies a predetermined benefit condition comprising accomplishing a mission successfully in the second game, wherein a predetermined benefit is set so that its value is higher, the higher the difficulty of the mission, that confers the predetermined benefit that can be used in the progression of the first game, on the one first user.

6. A non-transitory computer readable storage medium storing a computer program for a game machine in which a first game terminal that provides a first game to a first user group, a second game terminal that provides a second game to a second user group that is different from the first user group, and a server device that provides predetermined services to the first game terminal and to the second game terminal are connected together via a network, and which comprises a value data storage device adapted and configured to store value data in which a correspondence between first user information for specifying first users of the first user group, and predetermined values that are possessed by the first users and that can be used in the first game, is described, and wherein the computer program is configured so as to cause a computer which is incorporated in the game machine to serve as:
a situation provision device adapted and configured to, upon the condition that at least one first user of the first user group expends at least a portion of the predetermined value that he himself possesses, provide an advantageous situation for progression in the second game to a specified second user of the second user group; and
a benefit conferring device adapted and configured to determine that the specified second user satisfies a predetermined benefit condition comprising accomplishing a mission successfully in the second game, wherein the predetermined benefit is set so that its value is higher, the higher the difficulty of the mission, and confer the predetermined benefit that can be used in the progression of the first game, on the one first user.

7. A game system in which a first game terminal that provides a first game to a first user group, a second game terminal that provides a second game to a second user group that is different from the first user group, and a server device that provides predetermined services to the first game terminal and to the second game terminal are connected together via a network, comprising:
a value data storage device adapted and configured to store value data in which a correspondence between first user information for specifying first users of the first user group, and predetermined values that are possessed by the first users and that can be used in the first game, is described;
a situation provision device adapted and configured to, upon the condition that at least one first user of the first user group expends at least a portion of the predetermined value that he himself possesses, provide an advantageous situation for progression in the second game to a specified second user of the second user group;
a benefit conferring device adapted and configured to determine that the specified second user satisfies a predetermined benefit condition comprising accomplishing a mission successfully in the second game, and confer a predetermined benefit that can be used in the progression of the first game, on the one first user; and
wherein if, as at least the one first user, a plurality of first users expend the predetermined value for the specified second user, then the predetermined benefit varies so that the value of the benefit per one user becomes higher, the lower is the number of first users who expend the predetermined value.

8. A control method of controlling a computer incorporated in a game system in which a first game terminal that provides a first game to a first user group, a second game terminal that provides a second game to a second user group that is different from the first user group, and a server device that provides predetermined services to the first game terminal and to the second game terminal are connected together via a network, and which comprises a value data storage device adapted and configured to store value data in which a correspondence between first user information for specifying first users of the first user group, and predetermined values that are possessed by the first users and that can be used in the first game, is described, and wherein the control method of controlling the computer comprises the steps:

a situation provision step, upon the condition that at least one first user of the first user group expends at least a portion of the predetermined value that he himself possesses, that provides an advantageous situation for progression in the second game to a specified second user of the second user group;

a benefit conferring step, where it is determined that the specified second user satisfies a predetermined benefit condition comprising accomplishing a mission successfully in the second game, that confers a predetermined benefit that can be used in the progression of the first game, on the one first user; and wherein if, as at least the one first user, a plurality of first users expend the predetermined value for the specified second user, then the predetermined benefit varies so that the value of the benefit per one user becomes higher, the lower is the number of first users who expend the predetermined value.

9. A non-transitory computer readable storage medium storing a computer program for a game machine in which a first game terminal that provides a first game to a first user group, a second game terminal that provides a second game to a second user group that is different from the first user group, and a server device that provides predetermined services to the first game terminal and to the second game terminal are connected together via a network, and which comprises a value data storage device adapted and configured to store value data in which a correspondence between first user information for specifying first users of the first user group, and predetermined values that are possessed by the first users and that can be used in the first game, is described, and wherein the computer program is configured so as to cause a computer which is incorporated in the game machine to serve as:

a situation provision device adapted and configured to, upon the condition that at least one first user of the first user group expends at least a portion of the predetermined value that he himself possesses, provide an advantageous situation for progression in the second game to a specified second user of the second user group;

a benefit conferring device adapted and configured to determine that the specified second user satisfies a predetermined benefit condition comprising accomplishing a mission successfully in the second game, and confer a predetermined benefit that can be used in the progression of the first game, on the one first user; and wherein if, as at least the one first user, a plurality of first users expend a predetermined value for the specified second user, then the predetermined benefit varies so that the value of the benefit per one user becomes higher, the lower is the number of first users who expend the predetermined value.

* * * * *